United States Patent Office 3,498,758
Patented Mar. 3, 1970

3,498,758
METHOD OF RECOVERING STRONTIUM CHLORIDE
Remigius A. Gaska, Midland, Robert A. Canute, Mount Pleasant, and Maurice W. Putman, Midland, Mich., assignors to The Dow Chemical Company, Midland, Mich., a corporation of Delaware
No Drawing. Filed June 17, 1968, Ser. No. 737,377
Int. Cl. C01f 11/32; B01d 9/02, 57/00
U.S. Cl. 23—296                                8 Claims

ABSTRACT OF THE DISCLOSURE

A method of separating and recovering strontium chloride from an aqueous brine solution containing calcium chloride, and optionally other alkaline earth metal and alkali metal halides, which comprises admixing an alcohol with such a brine, cooling the mixture, separating out the resulting precipitate, and purifying the precipitate to remove remaining impurities to obtain highly pure strontium chloride.

BACKGROUND OF THE INVENTION

Field of the invention

The present invention provides a method of separating and recovering strontium chloride from a solution containing calcium chloride.

Prior art

Strontium is useful in preparing strontium compounds and as an alloying element. Sources of strontium include strontium chloride found in aqueous brine solutions of which $SrCl_2$ is only a minor portion, e.g., a fraction of one percent. These brines contain other alkaline earth metal and alkali metal halides such as calcium chloride, sodium chloride, potassium chloride, and magnesium chloride.

Strontium chloride may be recovered from brines containing calcium chloride by direct cooling of the brine solution to precipitate the strontium chloride. As an example of this method see U.S. Patent No. 1,831,251 wherein strontium chloride is separated from certain brines containing calcium chloride and magnesium chloride by cooling the solution below 31° C. However, such a method, although effectively removing the strontium chloride, e.g., about 70–80 percent of the strontium chloride precipitates, also has the disadvantage of co-precipitating a large amount of calcium chloride such that the ratio of $CaCl_2$ to $SrCl_2$, while reduced from the original solution, is still substantial, e.g., 20:1. This requires extensive purification of the precipitate and a high rate of calcium chloride recycle, both of which are expensive.

Therefore, a primary object of the present invention is to provide a method of separating and recovering strontium chloride from solutions containing calcium chloride and strontium chloride reducing or eliminating the need of further extensive purification due to calcium chloride co-precipitation.

THE INVENTION

This and other objects and advantages are found in the method of the present invention which comprises: admixing an aqueous solution of strontium chloride and calcium chloride with ethanol in an amount sufficient to obtain about 10 to about 45 percent alcohol solution; cooling the mixture to a temperature within the range of from about 20° C. to minus 10° C.; separating the resulting precipitate; purifying said precipitate, thereby obtaining substantially pure strontium chloride.

The aqueous solution should contain from about 25 to about 55 percent calcium chloride and an amount of strontium chloride such that the weight ratio of $CaCl_2$ to $SrCl_2$ at a maximum is about 100:1. The solution may also contain other alkaline earth metal and alkali metal halides, e.g., potassium chloride and magnesium chloride. If NaCl is present, it may be removed by the concentration of the solution by evaporation and subsequent filtration before employing the method of the present invention. Also if the initial calcium chloride concentration is less than the required amount, i.e., about 25 percent, the solution may be concentrated by evaporation before employing the method of the present invention.

The ethanol may be added to the brine in any conventional manner in an amount sufficient to provide from about 10 to about 45 weight percent ethanol concentration, preferably from about 20 to about 35 percent concentration.

The brine-ethanol mixture is cooled to a temperature within the range of from about 20° C. to about minus 10° C., preferably from about 10° C. to 0° C., thereby producing a precipitate of strontium chloride and calcium chloride hydrates together with impurities, such as potassium chloride. Furthermore, as a general rule for the most desirable results, the cooling temperature should be decreased as the initial calcium chloride concentration in the solution decreases. The calcium chloride and other impurities are in such amounts so as to be easily removed by purification.

The resulting precipitate is separated from the mother liquor by conventional means such as filtration or centrifugation. The mother liquor may be distilled to remove the alcohol for reuse.

Processing aqueous solutions as heretofore defined by the method as described above produces a solid, unpurified cake wherein the $CaCl_2$ to $SrCl_2$ weight ratio is about 1:1, whereas direct precipitation by cooling as is known in the prior art produces a precipitate with a $CaCl_2$ to $SrCl_2$ weight ratio of from about 10:1 to about 20:1.

Substantially pure strontium chloride can be recovered from the precipitate by purification such as by washing the precipitate in alcohol, using about 0.2 to 4 grams ethanol per grams of precipitate. Alternatively, the precipitate may be heated to a temperature within the range of from about 28° C. to about 50° C., thereby melting the calcium chloride impurity leaving a substantially pure strontium chloride solid which is separated from the melted calcium chloride by filtration or other conventional means. A combination of above purification scheme could also be used.

The strontium chloride so purified is in the form of strontium chloride dihydrate ($SrCl_2 \cdot 2H_2O$). The water may be removed by conventional means of drying to produce anhydrous $SrCl_2$, if desired.

Where potassium chloride is originally present in the aqueous solution, the precipitate will contain potassium chloride. This can be substantially avoided by cooling the brine-alcohol solution in two stages. First, the solution is cooled to a temperature within the range of about 20° C. to about 35° C. where a substantial amount of the potassium chloride will precipitate and may be separated from the mother liquor. The liquor is then further cooled as previously disclosed to precipitate $SrCl_2$. Where the precipitation is accomplished in one stage, the KCl may be separated from the $SrCl_2$ precipitate by leaching with water for a time sufficient to dissolve all the $SrCl_2$ present. The $SrCl_2$ rich liquid is conventionally separated from the KCl such as by filtration or centrifugation. The $SrCl_2$ liquor may then be handled by conventional techniques, e.g., evaporation, to precipitate the desired solid Sr products.

The following examples are representative of the present invention but are not limited thereto.

Examples 1–3

Measured amounts of various SrCl₂-containing brines were mixed with ethanol, cooled and the resulting precipitate analyzed for the CaCl₂ to SrCl₂ ratio and the percent SrCl₂ recovered. In some cases an alcohol purifying wash was used in accordance with the method of the present invention as disclosed herein.

For comparison, similar brine composition samples were cooled without ethanol, i.e., the conventional method of separation, and the resulting precipitate analyzed. The results are shown in the table.

TABLE

| Example No. | Feed brine composition, percent | | | | Ethanol Percent of Solution | Cooling temp., °C. | Purifying wash, g. ethanol | Precipitate Composition, percent [1] | | | | Percent SrCl₂ Recovered | CaCl₂/SrCl₂ Ratio |
|---|---|---|---|---|---|---|---|---|---|---|---|---|---|
| | CaCl₂ | KCl | SrCl₂ | NaCl | | | | CaCl₂ | KCl | SrCl₂ | NaCl | | |
| Comparative | 42.1 | 2.27 | 0.91 | 0.35 | | 18±0.5 | | 43.8 | 0.79 | 4.19 | 0.47 | 70 | 10.4 |
| Do | 40 | 2.1 | 0.9 | | | 18±0.5 | | 40.2 | | 2.42 | | 86 | 16.6 |
| 1 | 42.8 | 0.49 | 0.97 | 0.13 | 38.5 | 7 | | 32.6 | 3.55 | 40.8 | 0.89 | 66 | 0.80 |
| 2 | 42.8 | 2.50 | 0.92 | | 40 | 5 | 115 | 7.17 | 41.4 | 8.39 | 3.40 | 67 | 0.86 |
| 3 | 42.8 | 2.50 | 0.92 | 0.17 | 40 | 3.5 | 159 | 5.03 | 38.77 | 11.02 | 2.17 | 82 | 0.46 |

[1] Absolute numbers are a function of the amount of mother liquor retained on the crystals.

As the data of the table show, the method of the present invention employing an ethanol solution before cooling produces a precipitate with a CaCl₂ to SrCl₂ ratio about 10 times greater than the precipitate of the conventional method with no appreciable SrCl₂ recovery loss. The precipitate of the present invention method may then be further purified as previously described, e.g., ethanol wash, selective melting, to produce a substantially pure SrCl₂ product.

While the above specifies the operational limits for ethanol, if the concentration of the calcium chloride containing solution is higher than 55 weight percent CaCl₂, methanol may be substituted for ethanol in an amount sufficient to provide from about 10 to about 45 weight percent methanol concentration. Methanol can be used with an initial calcium chloride concentration of above 55 to about 70 weight percent in the brine solution and at a cooling temperature of from about 35° C. to about 20° C. For example, a brine containing 63.5 percent CaCl₂, 3.4 percent KCl, and 1.48 percent SrCl₂, when admixed with an amount of methanol sufficient to produce a 38 weight percent methanol solution and cooled to 25° C. will produce a precipitate having a CaCl₂ to SrCl₂ ratio of 1.62 with an 80 percent SrCl₂ recovery.

Methanol may also be used at CaCl₂ concentrations of less than about 55 percent provided the cooling temperature is lowered to less than about minus 10° C. For example, a brine containing 30.2 percent CaCl₂, 0.38 percent KCl and 0.62 percent SrCl₂, when admixed with an amount of methanol sufficient to produce a 30 weight percent methanol solution and cooled to minus 21° C. will produce a precipitate having a CaCl₂ to SrCl₂ ratio of 2.05 with a 64 percent SrCl₂ recovery.

Various modifications can be made in the present invention without departing from the spirit or scope thereof and it is understood that the invention is limited only as defined in the appended claims.

What is claimed is:

1. A method of separating strontium chloride from an aqueous solution comprising strontium chloride and calcium chloride, wherein the calcium chloride concentration is from about 25 to about 70 weight percent and the CaCl₂ to SrCl₂ proportion at a maximum is about 100 to 1, which comprises:
    (a) admixing with said aqueous solution an alcohol selected from the group consisting of methanol and ethanol in an amount sufficient to provide an alcohol concentration of from about 10 to about 45 weight percent in the final mixture;
    (b) cooling the resultant mixture to a temperature within the range of from about 20° C. to about minus 10° C., thereby precipitating a solid having a CaCl₂ to SrCl₂ proportion at a maximum of about 10 to 1;
    (c) separating the resultant precipitate;
    (d) purifying said precipitate, thereby obtaining substantially pure strontium chloride.

2. The method of claim 1 wherein the calcium chloride concentration is from about 25 to about 55 weight percent, and wherein the alcohol is ethanol.

3. The method of claim 1 wherein the aqueous solution contains, in addition to SrCl₂ and CaCl₂, potassium chloride and the process includes the additional steps of cooling the alcohol-aqueous solution mixture to a temperature of from about 35° C. to about 20° C. to precipitate the KCl; separating the resultant KCl precipitate from the mother liquor; and then cooling the residual mother liquor to a temperature of from about 20° C. to about minus 10° C. to recover SrCl₂.

4. The method of claim 1 wherein the aqueous solution contains potassium chloride; and includes the additional steps of separating the resulting solid potassium chloride impurity from said precipitate by leaching the precipitate with water, thereby dissolving the solid SrCl₂; removing the solid potassium chloride from the resulting aqueous SrCl₂ containing solution; and recovering the substantially pure SrCl₂ from said solution.

5. The method of claim 2 wherein the aqueous solution contains about 42 weight percent CaCl₂ and about 1 weight percent SrCl₂, wherein the ethanol concentration is about 40 weight percent of the final mixture, and wherein the cooling temperature is from about 10° C. to about 0° C.

6. The method of claim 1 wherein in step (d) the purifying is carried out by melting the precipitated solid at a temperature of from about 28° C. to about 50° C. thereby melting the CaCl₂, and separating the melted CaCl₂ from the remaining solid substantially pure SrCl₂.

7. The method of claim 1 wherein, in addition to SrCl₂ and CaCl₂, the aqueous solution also contains magnesium chloride.

8. The method of claim 1 wherein the calcium chloride concentration is from about 55 to about 70 weight percent and the alcohol is methanol.

References Cited

UNITED STATES PATENTS 2,030,659 2/1936 Shreve _____ 23—90
2,980,502 4/1961 Goodenough _____ 23—90 X
3,029,133 4/1962 Goodenough _____ 24—90 X
3,239,318 3/1966 Goodenough _____ 23—304 X NORMAN YUDKOFF, Primary Examiner S. J. EMERY, Assistant Examiner U.S. Cl. X.R.

23—90, 300, 304, 308